(12) United States Patent
Münchow

(10) Patent No.: US 8,926,747 B2
(45) Date of Patent: Jan. 6, 2015

(54) PREPARATION OF COATING DISPERSIONS

(71) Applicant: Alpha Calcit Füllstoff Gesellschaft mbH, Köln (DE)

(72) Inventor: Dieter Münchow, Köln (DE)

(73) Assignee: Alpha Calcit Fullstoff Gesellschaft MGH, Cologne (DE)

( * ) Notice: Subject to any disclaimer, the term of this patent is extended or adjusted under 35 U.S.C. 154(b) by 0 days.

(21) Appl. No.: 13/746,019

(22) Filed: Jan. 21, 2013

(65) Prior Publication Data

US 2013/0131249 A1    May 23, 2013

Related U.S. Application Data

(62) Division of application No. 12/665,429, filed as application No. PCT/EP2008/057362 on Jun. 12, 2008, now Pat. No. 8,382,891.

(30) Foreign Application Priority Data

Jun. 22, 2007 (EP) .................................... 07110917

(51) Int. Cl.
*C09C 1/02* (2006.01)
*C08K 3/26* (2006.01)
*D21H 19/38* (2006.01)
*D21H 19/00* (2006.01)
*D21H 21/52* (2006.01)

(52) U.S. Cl.
CPC ........ *C08K 3/26* (2013.01); *D21H 21/52* (2013.01); *C01P 2004/51* (2013.01); *D21H 19/385* (2013.01); *C09C 1/021* (2013.01)
USPC ......................................................... 106/463

(58) Field of Classification Search
USPC .................................................. 106/464, 463
See application file for complete search history.

(56) References Cited

U.S. PATENT DOCUMENTS

| 4,834,301 A | 5/1989 | Inkyo et al. |
| 5,605,568 A | 2/1997 | Naydowski et al. |
| 5,759,258 A | 6/1998 | Sohara et al. |
| 2007/0240619 A1 | 10/2007 | Munchow |

FOREIGN PATENT DOCUMENTS

| EP | 0515928 B1 | 12/1992 |
| EP | 0894836 A1 | 2/1999 |
| EP | 1764345 A1 | 3/2007 |
| EP | 1764346 A1 | 3/2007 |
| EP | 1764347 A1 | 3/2007 |
| WO | 98/01621 A1 | 1/1998 |
| WO | 02/090651 A1 | 11/2002 |
| WO | 2005/111153 A1 | 11/2005 |
| WO | 2007/031869 A1 | 3/2007 |

OTHER PUBLICATIONS

Maximilian Laufmann; Article—"Natural Ground and Precipitated Calciumcarbonate in Woodfree Papermaking"; S-PCC GCC TAPPI—www.tappi.org/Downloads—May 1976.

*Primary Examiner* — Pegah Parvini

(74) *Attorney, Agent, or Firm* — Clements Bernard PLLC; Gregory N. Clements

(57) ABSTRACT

The invention relates to a process for the preparation of coating dispersions for use in the paper industry by co-grinding natural calcium carbonate (GCC) and precipitated calcium carbonate (PCC), characterized in that powdery GCC is co-ground with a slurry containing from 5 to 70% by weight of PCC to obtain a particle size distribution of the calcium carbonate with at least 90% by weight of smaller than 5 μm, at least 70% by weight of smaller than 2 μm, and at least 20% by weight of smaller than 1 μm, with a weight average particle size within a range of from 0.7 to 3 μm.

4 Claims, No Drawings

PREPARATION OF COATING DISPERSIONS

FIELD OF THE INVENTION

The invention relates to a process for the preparation of coating dispersions for use in the paper industry by co-grinding natural calcium carbonate (GCC) and precipitated calcium carbonate (PCC), the coating dispersions obtainable thereby, and the use of the coating dispersions for the preparation of coating slips.

PRIOR ART

WO 98/01621 describes a process for the recycling of fillers and coating pigments from the preparation of paper, paperboard and cardboard. The specification relates to a process for recycling fillers and coating pigments from the preparation of paper, paperboard and cardboard found in the residual water sludges from coating plant waste waters, deinking plants, internal water treatment plants or separators, and to the use of a thus obtained pigment slurry for the preparation of a coating slip for the paper industry and/or in the paper stock for papermaking. An essential element consists in a process for the recycling of fillers and coating pigments from the preparation of paper, paperboard and cardboard found in the residual water sludges from coating plant waste waters, deinking plants, internal water treatment plants or separators, characterized in that the residual water sludges containing the fillers and coating pigments are subjected to mixing with fresh pigments or fresh fillers in the form of powders, fresh-pigment containing slurries and/or fresh-filler containing slurries, followed by milling to yield a pigment slurry.

WO 02/090651 A1 describes a process for the recycling of cleaner rejects from the preparation of paper, paperboard and cardboard, the use thereof in the stock for papermaking or as a coating slip for the paper industry.

WO 2005/111153 A1 describes surface-modified inorganic fillers and pigments. The specification relates to a process for the preparation of surface-modified inorganic fillers or pigments of a desired grain size, characterized in that filler or pigment slurries of inorganic fillers or pigments are milled to the desired grain size with the action of compression and shear forces using polymer dispersions, said fillers and/or pigments being further contacted with per se known milling aids and/or dispersing agents (active ingredients) in an amount of from 0.1 to 2.0% by weight, based on the fillers or pigments, the thus obtained fillers and pigments, and the use thereof for the preparation of dispersion paints, adhesives, coatings or coating slips for the paper industry, especially of coating slips for various segments, such as sheet-fed offset, rotary offset, intaglio printing, cardboard and special papers.

The three applications mentioned above are included herein by reference in their entirety, and thus their contents become part of the disclosure of the present invention.

EP 1 764 345 A1, EP 1 764 346 A1 and EP 1 764 347 A1 describe a process for the co-grinding of natural calcium carbonate (GCC) and precipitated calcium carbonate (PCC), and the thus obtained products, and the use thereof. The products obtained are characterized by different parameters, such as the ET surface area, the definition of the milling balls employed and the so-called steepness factor.

It is known to employ calcium carbonate in the paper industry as a component of paper pulp and as a coating pigment in order to improve both the printability properties and the optical properties of the end product, such as gloss, opacity and brightness. Calcium carbonate is known to occur in two different types, namely ground or natural calcium carbonate, usually referred to as GCC, and synthetic or precipitated calcium carbonate, usually referred to as PCC.

GCC is a calcium carbonate obtained from natural sources. In particular, limestone, marble or chalk may be mentioned. This GCC is usually brought to the desired grain size by grinding. In contrast, PCC is a synthetic material that is usually obtained by a precipitation reaction from calcium hydroxide in aqueous suspension in the presence of carbon dioxide. The crystallite properties of GCC and PCC differ significantly, as is known from EP 1 764 345 A1. The latter specification also refers to further prior art documents shedding light on the differences between GCC and PCC.

The essence of the three mentioned EP publications and the prior art acknowledged therein, especially EP 0 894 836 A1, is the co-grinding of GCC and PCC in an aqueous slurry that may contain a dispersing agent in addition to water and the two calcium carbonates. An essential feature of the above mentioned documents is the preparation of a pigment containing calcium carbonate and having a defined particle size distribution.

Thus, EP 0 894 836 A1 states a particle size distribution and grinding in which from 80 to 99% by weight is to be smaller than 2 µm, from 50 to 90% by weight is to be smaller than 1 µm, and from 0 to 10% by weight is to be smaller than 0.2 µm.

In EP 1 764 345 A1, EP 1 764 346 A1 and EP 1 764 347 A1, the particle size distribution is defined in such terms as to contain a fraction of particles of smaller than 1 µm in more than 80%, especially more than 85%, more preferably more than 90% and still more preferably more than 95%. Due to this very small particle size of less than 1 µm, this material is less suitable for application as a coating slip since the small filler particles will diffuse into the paper bulk when applied to the paper and thus only a small fraction thereof can contribute to the improvement of the optical properties of the paper.

In contrast, the object of the present invention is to provide coating dispersions for use in the paper industry by means of a novel process by co-grinding natural calcium carbonate (GCC) and precipitated calcium carbonate (PCC), which has an improved runnability on the coating machine and yields improved optical properties of the paper as compared to the prior art.

DESCRIPTION OF THE PREFERRED EMBODIMENT

In a first embodiment, the above object is achieved by a process for the preparation of coating dispersions for use in the paper industry by co-grinding natural calcium carbonate (GCC) and precipitated calcium carbonate (PCC), characterized in that powdery GCC is co-ground with a slurry containing from 5 to 70% by weight of PCC to obtain a particle size distribution of the calcium carbonate with at least 90% by weight of smaller than 5 µm, at least 70% by weight of smaller than 2 µm, and at least 20% by weight of smaller than 1 µm, with a weight average particle size within a range of from 0.7 to 3 µm.

By means of the present invention, i.e., by the co-grinding process, the weaknesses of one component (GCC or PCC) could be reduced almost to any extent desired or even completely eliminated by strengths of the other component (PCC or GCC, respectively). In particular, this applies to high-shear viscosity, bleeding, blade pressure, gloss development, printing ink consumption, opacity and suitability for intaglio printing. The use of powdery GCC in the preparation of coating slips allows an inexpensive process in PCC preparation since the extremely energy-consuming concentration/drying step that is usually required when PCC is employed may be dispensed with more or less completely. It is known that usual PCC slurries are obtained by precipitation with a PCC content on the order of 10 to 20% by weight and therefore must be concentrated to 60 to 75% by weight for use in usual coating slips. Thus, an extremely high energy consumption is required. On the other hand, the use of powdery GCC according to the invention drastically reduces the energy consumption since the concentration/drying of PCC slurries can be dispensed with either partially or completely depending on the specific requirements.

According to the invention, the runnability on the coating machine was examined by means of the viscosity data. It has been found that the blade contact pressure is very high when PCC alone is employed, while GCC alone requires a lower contact pressure. If co-ground PCC and GCC are employed, the necessary blade contact pressure, although becoming slightly higher, does not change substantially from that required for GCC alone.

Due to its specific crystal structure, PCC is often employed in paper pulp whereas GCC results in an excellent surface coverage and is therefore predominantly employed in coating slips. By means of the present invention, it could be found that the co-ground PCC and GCC slurries represent a significant improvement over the starting materials.

The high-shear viscosity, which is very high when PCC is used alone, is shifted by co-ground PCC and GCC combinations into the range of GCC alone.

It is known that PCC alone yields the highest values of gloss development while GCC alone causes a lower gloss. The GCC and PCC combination co-ground according to the invention are intermediate in terms of gloss development.

As to the printing ink consumption, it is known that GCC alone means the highest consumption whereas PCC alone means the lowest consumption. According to the invention, it has been found that the printing ink consumption of PCC and GCC co-ground slurries is but slightly higher than that of PCC alone.

From the prior art, it is known that GCC alone yields the lowest values of opacity whereas PCC alone yields the highest values. Co-ground combinations of GCC and PCC according to the invention have a better opacity as compared to GCC alone.

In the test for suitability for intaglio printing, the number of printing defects is examined. GCC alone usually yields the highest number of defects whereas PCC alone yields the lowest number of defects. The combination co-ground according to the invention is significantly better than GCC alone.

The co-ground products prepared according to the invention could be referred to as combined carbonates. The combination offers a broad flexibility and the possibility to prepare tailored products having the best possible property profile directly on site.

For example, the grinding conception could be varied thus:
A: PCC type X+GCC Calcicell® 30;
B: PCC type Y+GCC Calcicell® 30;
C: PCC type X/Y+Calcicell® 30+ coating slip or cleaner rejects.

The property profile of co-ground PCC-GCC in combinations is better than that of PCC-GCC mixtures and can be further optimized by supplying coating slip or cleaner rejects.

In detail, the following coating slip and coating properties could be improved as follows:
A) Runnability at 2 μm
A1) Blade contact pressure (scoring: high pressure=bad (6), low pressure=good (1))

a) Final quality: Cover coating, pigment 90% of <2 μm

|   | at 900 m/min coating speed | Score |
|---|---|---|
| 1 | standard | 1 |
| 3 | PCC alone | 5 |
| 2 | PCC + GCC (75 + 25) co-ground | 1.5 |
| 4 | PCC + GCC (75 + 25) mixed | 2.5 | b) Final quality: Precoating, pigment 60% of <2 μm

|   | at 1400 m/min coating speed | Score |
|---|---|---|
| 1 | standard | 1 |
| 4 | PCC alone | 3 |
| 3 | PCC + GCC (75 + 25) co-ground | 2 |
| 2 | PCC + GCC (25 + 75) co-ground | 1-2 |
| 6 | PCC + GCC (75 + 25) mixed | 1-2 |

A2) "Bleeding"=Stalagmite formation
(scoring: none=best score (1), very strong=worst score (6))
a) Final quality: Cover coating, pigment 90% of <2 μm

|   | at 800 m/min coating speed | Score |
|---|---|---|
| 1 | standard | 1/1.5 |
| 3 | PCC alone | 1.5/1.5 |
| 2 | PCC + GCC (75 + 25) co-ground | 1/1 |
| 4 | PCC + GCC (75 + 25) mixed | 1/1 | b) Final quality: Precoating, pigment 60% of <2 μm

|   | at 1400 m/min coating speed | Score |
|---|---|---|
| 1 | standard | 1/1 |
| 4 | PCC alone | 6/6 |
| 3 | PCC + GCC (75 + 25) co-ground | 1/1 |
| 2 | PCC + GCC (25 + 75) co-ground | 1/1 |
| 6 | PCC + GCC (75 + 25) mixed | 1.5/2 |

A3) Viscosity
High-shear viscosity→capillary viscometer
Shear forces 360,000→1,500,000 $s^{-1}$
a) Final quality: Precoating/matte coating=pigment 60% of <2 μm

| Comparison of coating slips | Viscosity range, mPa·s |
|---|---|
| No. 6 100% standard GCC 60 | 35-25 |
| No. 9 100% PCC type X | 70-77 |
| No. 7 25% PCC type Y + 75% GCC co-ground | 26-31 |
| No. 8 75% PCC type Y + 25% GCC co-ground | 34-41 |
| No. 10 25% PCC type X + 75% GCC co-ground | 30-38 |
| No. 11 25% PCC type Y + 75% GCC co-ground | 30-38 |

No. 6 GCC alone: (No. 9) very low viscosity
No. 9 PCC alone: very high viscosity
Nos. 10 and 11: For PCC/GCC mixtures, the viscosity is reduced (No
No. 7 Co-grinding PCC/GCC further reduces the viscosity
b) Final quality for cover coating, pigment 90% of <2 μm

| Comparison of coating slips | Viscosity range, mPa·s |
|---|---|
| No. 2 100% standard GCC 90 | 26-34 |
| No. 4 100% PCC type Y | 52-61 |

-continued

| Comparison of coating slips | Viscosity range, mPa·s |
|---|---|
| No. 3 75% PCC type X + 25% GCC co-ground | 28-32 |
| No. 5 75% PCC type X + 25% GCC mixed | 47-54 |

By mixing PCC and GCC, the viscosity is slightly reduced as compared to PCC alone.

Co-grinding, even with a GCC proportion of only 25%, clearly reduces the viscosity, i.e., virtually to the level of GCC alone.

B) Satinizability→gloss development measured "on-line" in the calendar, expressed in %
Final quality: Cover coatings, pigment 90% of <2 μm

| | at 12 g/m² coating density | Gloss % |
|---|---|---|
| 1 | standard | 37/40 |
| 4 | PCC alone | 64/65 |
| 3 | PCC + GCC (75 + 25) co-ground | 47/52 |
| 2 | PCC + GCC (25 + 75) co-ground | 40/43 |
| 6 | PCC + GCC (25 + 75) mixed | 40/43 |

C) Printing ink consumption to obtain the same color intensity exemplified for the 1st printing unit.
Final quality: Precoating or matte coating, pigment 60% of <2 μm for 15 or 12 g/m² coating density

| | | speed of the ink roller, % |
|---|---|---|
| 1 | standard | 18/20 |
| 4 | PCC alone | 12/13 |
| 3 | PCC + GCC (75 + 25) co-ground | 15/18 |
| 2 | PCC + GCC (25 + 75) co-ground | 16/18 |
| 6 | PCC + GCC (25 + 75) mixed | 18/18 |

D) Opacity (in %)
Final quality: Precoating or matte coating, pigment 60% of <2 μm for 12 or 15 g/m² coating density

| | | Opacity % |
|---|---|---|
| 1 | standard | 91/91.5 |
| 4 | PCC alone | 92.7/93.3 |
| 3 | PCC + GCC (75 + 25) co-ground | 91.7/92.3 |
| 2 | PCC + GCC (25 + 75) co-ground | 91.6/92.0 |
| 6 | PCC + GCC (25 + 75) mixed | 91.0/91.3 |

E) Suitability for intaglio printing
So-called "missing dots" (m.d.), i.e., defects in the print on a defined surface area, were counted.
Final quality: matte coating, pigment 60% of <2 μm

| | coating density 12 g/m² | number of m.d. |
|---|---|---|
| 1 | standard | 43 |
| 4 | PCC alone | 14 |
| 3 | PCC + GCC (75 + 25) co-ground | 32 |
| 2 | PCC + GCC (25 + 75) co-ground | 34 |
| 6 | PCC + GCC (25 + 75) mixed | 42 |

Advantages of the co-grinding of PCC slurry with powdery GCC in the preparation of high concentration pigment suspensions:

In the paper coating industry, coating slips with as high solids contents as possible of up to 68% by weight are demanded in order that as little energy as possible must be employed for drying the coating. Since binders and other coating slip additives have dry contents of maximally 50% by weight or clearly less, the pigment suspensions must therefore be prepared with very high pigment concentrations, which usually reach from 75 to 78% by weight in calcium carbonate slurries of GCC.

Therefore, in the preparation of mixtures of GCC and PCC slurries, both components must have this high dry content. However, PCC slurries are usually obtained with only maximally 20% dry content and therefore must be concentrated with high expenditure.

In contrast, in the co-grinding of GCC powder with PCC slurry, the dry contents of the PCC slurries may be significantly lower.

The necessary (solids/dry content) of the PCC slurries in the co-grinding process naturally depends on the ratio of powdery GCC to PCC slurry employed. The higher the proportion of powdery GCC, the lower the solids content of the PCC slurry can be.

On the other hand, if the ratio of GCC to the PCC slurries is shifted, then higher solids concentrations of the PCC slurries are required. It is particularly preferred to employ a PCC-GCC slurry containing a small amount of PCC because a large amount of energy for the concentration/drying of the PCC slurry can be saved in this way, as described above. Accordingly, it is particularly preferred according to the present invention to employ PCC-GCC slurries containing from 5 to 70% by weight, especially from 10 to 40% by weight, more preferably from 10 to 25% by weight, of PCC.

For the pigment suspensions to enter the paper industry directly, the solids content of the suspensions should be within a range as covered by pigment suspensions of the prior art. Thus, according to the invention, it is particularly preferred to co-grind pigment suspensions having a solids content of at least 50% by weight, especially at least 60% by weight, more preferably at least 70% by weight. If the solids content of the suspensions is too low, the turnover times are usually too long because there is too little energy input onto the individual particles.

In addition to the GCC and PCC, fresh pigments and/or fresh fillers per se known in the prior art may additionally be employed. It is particularly preferred according to the present invention to use white clay, artificial and/or natural aluminum silicates and oxide hydrates, satin white, dolomite, mica, metal flakes, especially aluminum flakes, sheet silicates, especially bentonite, rutile, magnesium hydroxide, gypsum, talc, alumina, titanium dioxide, calcium silicate and other rocks and earths, alone or as mixtures thereof, for said co-grinding.

In another embodiment of the present invention, polymer dispersions are also employed in addition to the pigments during the co-grinding. The use of appropriate polymer dispersions is known, for example, from WO 2005/111153. Also within the scope of the present invention, these polymer dispersions show the property of not leading to clotting or agglomeration of the coating slip particles, but evidently form a thin film on the surface of the pigments in this case too, which have a very much better adhesion to one another and to the substrate, for example, fibers in the paper industry. The origin of these polymer dispersions can be from new materials employed, or from residual water sludges.

When the coating suspensions are applied during paper making, a high proportion of the binder usually evades into the paper surface. A major proportion of the binder is absorbed into the raw paper before film formation occurs. The topmost coating layer becomes deficient of binder, and so-called plucking takes place. However, if the polymer binder is co-ground with the coating slips, migration of the binder does not occur, or only to a low extent; i.e., the offset strength (resistance to plucking) is higher because no (or little) binder is lost by absorption.

Polymer dispersions according to the present invention include all dispersions (latices) of finely dispersed natural and/or synthetic polymers, especially in a particle size of from 0.05 to 6 µm. They are usually in the form of aqueous, less frequently of non-aqueous, dispersions. These include dispersions of polymers, such as natural (rubber latex) and synthetic rubber (synthetic latex), as well as artificial resins (artificial resin dispersions) and plastic materials (plastic dispersions), such as polymerizates, polycondensates and polyaddition compounds, especially based on polyurethane, styrene/butadiene, styrene/acrylic acid or acrylate, styrene/butadiene/acrylic acid or acrylate as well as vinyl acetate/acrylic acid or acrylate as well as dispersions containing acrylonitrile.

Such dispersions are commercially available, for example, under the product designations of Basonal®, Acronal® and Styronal® as binders for the dispersions slip industry and for paper and cardboard coating. In the prior art, such polymer dispersions are incorporated into the filler or pigment slurries usually adjusted to neutral to alkaline by stirring without substantial shear, without a change of the grain size of the filler particles or pigment particles occurring. However, according to the present invention, these are directly contacted with the inorganic pigments by allowing compression and shear forces to act. Under the action of compression and shear forces during the grinding, surface-modified inorganic pigments are obtained that exhibit an improved binding action as compared to the prior art. It is particularly preferred according to the present invention to subject the inorganic pigments to wet grinding to the desired grain size in the presence of the polymer dispersions. Thus, it is possible to prepare a wide variety of the whiteness and size distribution of the pigments for white fillers or pigments, wherein such variation can be controlled, in particular, by the kind and duration of the grinding.

The amount of the polymer dispersions contacted with the inorganic pigments is of some importance. Thus, according to the present invention, it is particularly preferred to contact the inorganic pigments with an amount of from 0.1 to 50%, especially from 5 to 15%, by weight of polymer dispersion (solids), based on the amount of pigment. The polymer dispersions are usually in aqueous or non-aqueous form with a solids content of from 40 to 60% by weight, especially 50% by weight.

According to the present invention, the inorganic pigments are further contacted, in addition to the polymer dispersions, with per se known dispersing agents or milling aids, especially polyacrylates. Such polyacrylates are described, for example, in the initially mentioned EP 0 515 928 B1, which is included herein by reference.

According to the present invention, the fillers or pigments are contacted with the above mentioned dispersing agent active ingredient in an amount of from 0.01 to 3.0%, more preferably from 0.2 to 0.4%, by weight, based on the solid matter.

In the residual water sludges from the coating plant waste waters of papermaking and deinking plants, internal water treatment plants or separators, the coating pigments are often in agglomerated form and in a low whiteness, which limits direct reuse in raw material processing, especially in paper coating, or even makes it impossible.

By means of the present invention of the above described process, a defined concentrated pigment slurry is obtained even by using residual water sludges and can be employed in the preparation of paper, paperboard and cardboard.

Part or all of the amount of water necessary for grinding the inorganic pigments can be replaced by the residual water sludges. Agglomerates of the pigments that are usually present in the residual water sludges are not a great problem because they are disrupted to the desired grain sizes in the course of the milling process.

The pigment particles of the residual water sludge intended for use as a pigment act as a milling aid and dispersing aid for the disruption of the aggregates during the grinding process. At the same time, the residual water sludge inclusive of the charged particles acts as a dispersing aid and milling aid for the added fillers and pigments in the grinding process, so that the otherwise usual amounts of binders, dispersing aids and milling aids can be reduced according to the invention.

Accordingly, it is particularly preferred according to the invention to adjust the residual water sludge at a solids concentration of 0.02% to 60% by weight, especially 1% to 30% by weight, for the mixing and subsequent grinding with the polymer dispersion, fresh pigment or fresh filler as a powder or slurry containing fresh pigment and/or fresh filler. When the concentration is too low, the recycling process becomes economically inefficient.

In the residual water sludges of the paper industry, the ratio of fillers and/or pigments to fibers may vary widely. According to the present invention, it is particularly preferred to employ residual water sludges with an optionally enriched concentration of fillers and/or pigments that is within a range of from 1% to 80% by weight, especially from 20% to 60% by weight, based on the solids content. Thus, the fiber fraction on the one hand or the filler and/or pigment fraction on the other may vary, for example, from 2% to 98% by weight or from 98% to 2% by weight, respectively. Of course, fiber-free residual water sludges can also be employed in the paper industry according to the invention.

In an exemplary way, the preferred compositions of various residual water or waste water sludges may be illustrated here. Preferably, the waste water from production includes from 0.5 to 5% by weight, especially 2.5% by weight, of lost matter for a specific fresh water demand of from 10 to 100 l/kg, especially 20 l/kg. The concentration of the residual water sludges is preferably from 0.02% to 5.0%, especially 1.5%, by weight. Particularly preferred according to the invention is a quantitative ratio of fiber fraction to filler and/or pigment fraction (in % by weight) of 20 to 80 or 80 to 20, especially fibers to pigment (in % by weight) at a ratio of 40 to 60, of a waste water from paper production.

This allows for a flexible and prompt reaction to quality and production demands, for example, of the various paper raw materials for the paper pulp, the fillers or pigments or slurries for the precoating, cover coating and single coating or the pigmentation alone, and the mixing with other fillers or pigments.

According to the present invention, per se known additives, such as wetting agents, stabilizers, milling aids and dispersing aids, may be employed during the mixing and/or grinding of the inorganic fillers and pigments.

The pigment slurries obtainable by means of the present invention may be employed to particular advantage in the paper industry, especially for the preparation of a coating slip for paper coating or in the paper pulp. Particularly preferred is the use thereof for the preparation of a coating pigment slurry for offset paper. In addition, the slurries according to the invention are also suitable for the preparation of a coating slip for lightweight coated papers, especially for high coating speeds, and for the preparation of rotary offset papers, especially for the preparation of lightweight coated rotary offset papers, the coating of cardboard and special paper, such as labels, wallpapers, silicone raw paper, non-carbon papers, packaging papers, and for admixing in intaglio printing papers. Thus, the coating pigment slurries obtainable according to the invention can be employed, in particular, in sheet-fed offset process, especially for sheet-fed offset single coating, sheet-fed offset double coating, i.e., sheet-fed offset precoating and sheet-fed offset cover coating; in rotary offset process, especially for LWC rotary offset single coating, rotary offset double coating, i.e., rotary offset precoating and rotary offset cover coating; in intaglio printing, especially for LWC intaglio printing single coating, intaglio printing double coating, i.e., intaglio printing precoating and intaglio printing cover coating; in cardboard, especially for cardboard multiple coating, i.e., cardboard precoating and cardboard cover coating; as well as flexographic printing and for special papers, especially for labels and flexible packaging. The fillers and pigments according to the invention can also be advantageously employed in paper for digital printing methods.

The process offers the possibility to employ the pigment slurries prepared according to the invention without quality losses in the raw papers, coatings and especially the final qualities prepared therefrom.

Due to the energy input, the temperature during the co-grinding will increase by itself. Especially for the film formation of the polymer dispersions, it is particularly preferred according to the invention to perform the co-grinding at a temperature of at least 50° C. The co-grinding is preferably performed in the presence of milling balls having an equivalent diameter of up to 5 mm, especially within a range of from 0.2 to 2 mm. As is known from the literature, zirconium dioxide milling balls stabilized by ceria and/or yttria are particularly suitable for this purpose.

Another embodiment of the present invention relates to the coating dispersions obtainable by the present process.

In another embodiment according to the invention, these coating dispersions are employed for the preparation of coating slips in the paper industry, especially for coatings, or for various segments of paper industry, such as sheet-fed offset, rotary offset, intaglio printing, cardboard and special papers.

The invention claimed is:

1. A calcium carbonate coating dispersion for use in the paper industry containing co-grinded natural calcium carbonate (GCC) and 5 to 70% by weight of precipitated calcium carbonate (PCC), said GCC and PCC having a particle size distribution with at least 90% by weight of smaller than 5 μm, at least 70% of weight of smaller than 2 μm, and at least 20% by weight of smaller than 1 μm, with a weight average particle size within a range of from 0.7 to 3 μm, said GCC and PCC coated with a polymer selected from styrene/acrylic acid or styrene/acrylate or styrene/butadiene/acrylic acid or styrene/butadiene/acrylate.

2. The calcium carbonate coating dispersion of claim 1, wherein said polymer has a particle size in a range of 0.05-6 μm.

3. The coating dispersion of claim 1, characterized in that said PCC is present from 10 to 40% by weight.

4. The coating dispersion of claim 1, characterized in that said coating dispersion has a solids content of at least 50% by weight of said coating dispersion.

\* \* \* \* \*